(12) United States Patent
Rezk et al.

(10) Patent No.: US 8,687,173 B2
(45) Date of Patent: Apr. 1, 2014

(54) COMPACT FIBER OPTIC GEOMETRY FOR A COUNTER CHIRP FMCW COHERENT LASER RADAR

(75) Inventors: Mina Rezk, Bristow, VA (US); Anthony Slotwinski, Woodbridge, VA (US)

(73) Assignee: Nikon Metrology N.V., Leuven (BE)

( * ) Notice: Subject to any disclaimer, the term of this patent is extended or adjusted under 35 U.S.C. 154(b) by 302 days.

(21) Appl. No.: 13/061,559

(22) PCT Filed: Sep. 11, 2009

(86) PCT No.: PCT/US2009/056667
§ 371 (c)(1),
(2), (4) Date: May 11, 2011

(87) PCT Pub. No.: WO2010/030884
PCT Pub. Date: Mar. 18, 2010

(65) Prior Publication Data
US 2011/0205523 A1 Aug. 25, 2011

Related U.S. Application Data

(60) Provisional application No. 61/096,261, filed on Sep. 11, 2008.

(51) Int. Cl.
*G01C 3/08* (2006.01)

(52) U.S. Cl.
USPC ........ 356/5.09; 356/4.09; 356/5.15; 356/28.5

(58) Field of Classification Search
None
See application file for complete search history.

(56) References Cited

U.S. PATENT DOCUMENTS 4,340,304 A * 7/1982 Massie .......................... 356/489
4,812,035 A 3/1989 Freedman et al.
(Continued)

FOREIGN PATENT DOCUMENTS

| EP | 1906137 A1 | 4/2008 |
| JP | 04234710 A | 8/1992 |

(Continued)

OTHER PUBLICATIONS

International Search Report dated Apr. 27, 2010 for PCT/US09/56667.

(Continued)

*Primary Examiner* — Isam Alsomiri
*Assistant Examiner* — Samantha K Abraham
(74) *Attorney, Agent, or Firm* — Burns & Levinson LLP; Orlando Lopez

(57) ABSTRACT

A system and method for determining a measured distance between a measuring device (20A) and an object (21), the system including a first laser source (13) for producing a first light beam (13A) having a first waveform (32) and a first frequency; a second laser source (11) for producing a second light beam (1 IA) having a second frequency, said second light beam (HA) having a second waveform (36), wherein said first frequency is chirped up at the first rate as said second frequency is chirped down at the first rate, and said second frequency is chirped up at the second rate as said first frequency is chirped down at the first rate; an optical element (15) for combining said first light beam (13A) with said second light beam (HA) into a combined light beam path (17), said optical element (15) splitting a returning portion of said combined light beam path (17) into a third light beam (24); and a single detector (23) for receiving said third light beam (24) including two different beat frequencies that are proportional to the measured distance.

29 Claims, 12 Drawing Sheets

(56) References Cited

U.S. PATENT DOCUMENTS

| | | | |
|---|---|---|---|
| 6,153,886 A * | 11/2000 | Hagiwara et al. | 250/548 |
| 6,469,778 B2 * | 10/2002 | Asaka et al. | 356/28.5 |
| 7,139,446 B2 * | 11/2006 | Slotwinski | 385/12 |
| 7,697,143 B2 * | 4/2010 | Sanders et al. | 356/460 |
| 7,699,469 B2 * | 4/2010 | Sebastian et al. | 351/209 |
| 2002/0071109 A1 * | 6/2002 | Allen et al. | 356/5.01 |
| 2006/0066839 A1 | 3/2006 | Payton | |
| 2006/0182383 A1 | 8/2006 | Slotwinski | |
| 2008/0189046 A1 * | 8/2008 | Eliasson et al. | 702/19 |
| 2008/0221814 A1 * | 9/2008 | Trainer | 702/70 |

FOREIGN PATENT DOCUMENTS

| | | | |
|---|---|---|---|
| JP | 10-078335 A | 3/1998 | |
| WO | 2006/034211 A2 | 3/2006 | |
| WO | 2007/087301 A2 | 8/2007 | |

OTHER PUBLICATIONS

Honeycutt, T.E. et al. "FM-CW Radar Range Measurement With a CO2 Laser," IEEE Journal of Quantum Electronics, Feb. 1972, 91-92.
Notification of First Office Action from the State Intellectual Property Office of the People's Republic of China, dated Mar. 27, 2012 from co-pending Chinese Application No 200980135345.5, filed on Sep. 11, 2009 which claims the benefit of U.S. Appl. No. 61/096,261, filed on Sep. 11, 2008.
English translation of Decision of Rejection issued Jul. 2, 2013 for Chinese Application No. 200980135345.5.
Notice of Reasons for Rejection for Japanese Application No. 2011-526995 dated Nov. 19, 2013.

* cited by examiner

COMPACT FIBER OPTIC GEOMETRY FOR A COUNTER CHIRP FMCW COHERENT LASER RADAR

CROSS-REFERENCE TO RELATED APPLICATIONS

This application is a U.S. national stage application under 35 U.S.C. 371 of international Application No. PCT/US2009/056667 filed on Sep. 11, 2009 and entitled COMPACT FIBER OPTIC GEOMETRY FOR A COUNTER CHIRP FMCW COHERENT LASER RADAR, which in turn claims priority to U.S. Provisional Patent Application No. 61/096,261 filed on Sep. 11, 2008.

BACKGROUND

The present embodiment relates generally to optical sensors for measuring distances to objects (targets).

While it is known to transfer light through optical fibers, precision can be compromised due to the environmental effects on the fiber itself. These environmental effects can change the optical path length and the polarization of the light in the fiber, and can adversely affect measurement precision. The use of optical heterodyne detection can allow for optical radiation detection at the quantum noise level. As such, coherent optical systems can provide improvements in range, accuracy, reliability, scanning range, working depth of field, and operation in ambient light conditions. Furthermore, a coherent system can obtain sufficient information about the characteristics of a target location quickly.

Optical heterodyne detection includes a source light beam which is directed to a target and reflected therefrom. The return light beam is then mixed with a local oscillator light beam on a photo detector to provide optical interference patterns which may be processed to provide detailed information about the target. Optical heterodyne techniques can take advantage of the source and reflected light beam reciprocity. For example, these light beams can be substantially the same wavelength and are directed over the same optical axis. In this case, the signal-to-noise ratio (SNR) is sufficiently high so that a small receiving aperture may be used, for example, a very small lens capable of being inserted into limited access areas. Since a small receiver aperture can provide detailed information about the target, the optical components of a coherent system may be made very small.

Precision FM laser radars can incorporate a single chirp laser source and a polarization maintaining fiber optic geometry with separate local oscillator (LO) and signal paths. What is needed is a counter-chirp configuration that is made insensitive to vibration induced range errors by an accurate Doppler correction. What is further needed is combining the LO and signal paths for two lasers into a single fiber, so that the fiber optic circuit is less complicated, less expensive due to fewer components, and immune to error caused by changes in the LO and signal path lengths that result from environmental factors such as temperature changes. For example, the manufacturing industry, in which both background vibrations and changing environmental conditions exist, could be a candidate user for this laser configuration. The combination of LO and signal paths can provide the additional benefit that the sensor head portion of the unit can be placed in areas of restricted volume since it can be remoted arbitrarily far from the rest of the unit.

In summary, what is needed is a practical optical precision measurement system capable of great accuracy, rapid measurement time, access to tight spaces, flexibility, and reliability.

SUMMARY

The needs set forth above as well as further and other needs and advantages are addressed by the embodiments set forth below.

The present embodiment relates to an optical distance measuring apparatus that can include, but is not limited to including, a first laser source for producing a first light beam, a second laser source for producing a second light beam, where waveforms for the first and second light beams are 180 degrees out of phase with each other so that the first light beam is chirped up as the second light beam is chirped down and vice versa, a first optical element for combining the first and second light beams into a combined light beam, and for splitting any returning portion of the combined light beam into third light beam, and a first detector for receiving the third light beam, In another embodiment, a method for determining a range of a distant object is envisaged, including producing a first light beam from a first laser source and a second light beam from a second source, where waveforms for the first and second light beams are 180 degrees out of phase with each other so that the first light beam is chirped up as the second light beam is chirped down and vice versa, directing light emitted from the sources toward an object, receiving a reflected LO path and target-reflected signal path for each source, detecting the LO path and signal path for each source, and heterodyning the paths for each source to generate a beat frequency, which frequency is proportional to the range difference between the two paths, and where the path length difference between the LO path and corresponding signal path is equal to the distance to be measured.

The method for determining a measured distance between an output of a measuring device and an object of the present embodiment can include, but is not limited to including, the steps of producing a first light beam having a first frequency from a first laser source and a second light beam having a second frequency from a second laser source, chirping up the first frequency at a first rate as the second frequency is chirped down at a second rate, chirping up the second frequency at the second rate as the first frequency is chirped down at the first rate, combining the first light beam and the second light beam, directing the combined light beam path toward the object, receiving a reflected local oscillator (LO) path light beam associated with the combined light beam path, receiving a target-reflected signal path light beam associated with the combined light beam path, and heterodyning the LO path light beam and the target-reflected signal path light beam to generate two different beat frequencies that are proportional to the measured distance, the two beat frequencies being detected by a single detector.

The system for determining a measured distance between a measuring device and an object can include, but is not limited to including, a first laser source for producing a first light beam having a first waveform and a first frequency, a second laser source for producing a second light beam having a second frequency, the second light beam having a second waveform, wherein the first frequency is chirped up at a first rate as the second frequency is chirped down at a second rate, and the second frequency is chirped up at the second rate as the first frequency is chirped down at the first rate, an optical element for combining the first light beam with the second light beam into a combined light beam path, the optical element splitting a returning portion of the combined light beam path into a third light beam, and a single detector for receiving the third light beam including two different beat frequencies that are proportional to the measured distance.

In somewhat less general terms the present embodiment is a diplex dual-chirp laser apparatus for precision absolute distance measurement comprising a first frequency-modulated laser that emits a first coherent light beam having a first emission frequency modulated by a first chirping modulation signal and a second frequency-modulated laser that emits a second coherent light beam having a second emission frequency modulated by a second chirping modulation signal. The second chirping modulation signal is established to chirp with a constant phase difference from the first chirping modulation signal, preferably a 180° phase difference. Furthermore, the chirp rate of the second laser is sufficiently different from that of the first that two distinctly measurable beat frequencies are produced at the detector. The present embodiment can further comprise a fiber optic coupler optically connected to the first frequency-modulated laser wherein the first coherent light beam is split into two nominally 50% fractions. Additionally the fiber optic coupler is optically connected to the second frequency-modulated laser, wherein the second coherent light beam is split into two nominally 50% fractions.

There is also an interface at the beam exit end of the linear polarization-maintaining fiber, whereby a fraction of the transmitted light from each of the first coherent light beam and the second coherent light beam is reflected back toward the fiber optic coupler and thence transmitted into the photodetector and whereby a complementary fraction of the transmitted light is transmitted to the target and returned to the interface from the target; an optical detector optically connected to the fiber optic coupler; whereby a first interference is established between the reflected fraction of the transmitted light from the first coherent light beam and the return of the first coherent light beam from the target and whereby the optical detector detects a first beat frequency from the first interference and a second beat frequency from the second interference whereby a second interference is established between the reflected fraction of the transmitted light from the second coherent light beam and the return of the second coherent light beam. Thereafter the beat frequency signals are sent to digital signal processing apparatus configured to produce a first beat frequency measurement and a second beat frequency measurement. In the present embodiment a calibrated reference arm standard can be optically connected to the fiber optic coupler and can receive one of the two nominal 50% fractions of the first coherent light beam and further producing a first reference arm output; this reference arm also receives one of the two nominal 50% fractions of the second coherent light beam and further producing a second output frequency. Computer apparatus can combine the first beat frequency measurement with the first reference arm output to produce a first absolute distance measurement, and further can combine the second beat frequency measurement with the second reference arm output to produce a second absolute distance measurement. The computer apparatus can further combine the first absolute distance measurement with the second absolute distance measurement to produce a composite absolute distance measurement, wherein uncertainty in the composite absolute distance measurement is substantially reduced.

Optionally the calibrated reference arm standard is a fiber optic interferometer. Optionally as well, the fiber optic interferometer can include a first fiber optic coupler optically connected to a second fiber optic coupler, the first fiber optic coupler capable of splitting incoming light into a two parts; two fiber optic fibers of different optical path lengths having a calibrated optical path length difference and each receiving a part of the incoming light from the first fiber optic coupler; coupler termination at the end of each fiber whereby the light is reflected back to the fiber coupler, whereby the two parts of the light from the two fiber optic fibers are recombined, whereby an interference and a consequent beat frequency are established; a detector that detects the beat frequency. The results proceed to digital signal processing apparatus configured to produce a beat frequency measurement for each laser, and said beat frequency measurement for each laser comprises the reference arm output for the reference arm standard.

The present embodiment can be applied in non-contact precision distance measuring applications in unstable environments such as exist in airplane and automotive factories, for example, for in-line measurements of parts as they are being assembled.

For a better understanding of the present embodiments, together with other and further embodiments thereof, reference is made to the accompanying drawings and detailed description.

DETAILED DESCRIPTION

Before the present embodiments are described, it is understood that this disclosure is not limited to the particular devices, methodology and components described as these may vary. It is also to be understood that the terminology used herein is for the purpose of describing particular embodiments only, and is not intended to limit the scope of this disclosure. The following configuration description is presented for illustrative purposes only. Any configuration and architecture satisfying the requirements herein described may be suitable for implementing the system and method of the present embodiments.

It should be further understood that as used herein and in the independent claims, the singular forms "a," "an," and "the" include plural reference unless the context clearly dictates otherwise. Thus for example, reference to "an isolator" includes a plurality of such isolators, reference to a "lensing system" is a reference to one or more lenses and equivalents thereof known to those skilled in the art. Unless defined otherwise, all technical and scientific terms used herein have the same meanings as commonly understood by one of ordinary skill in the art.

Figure 1:
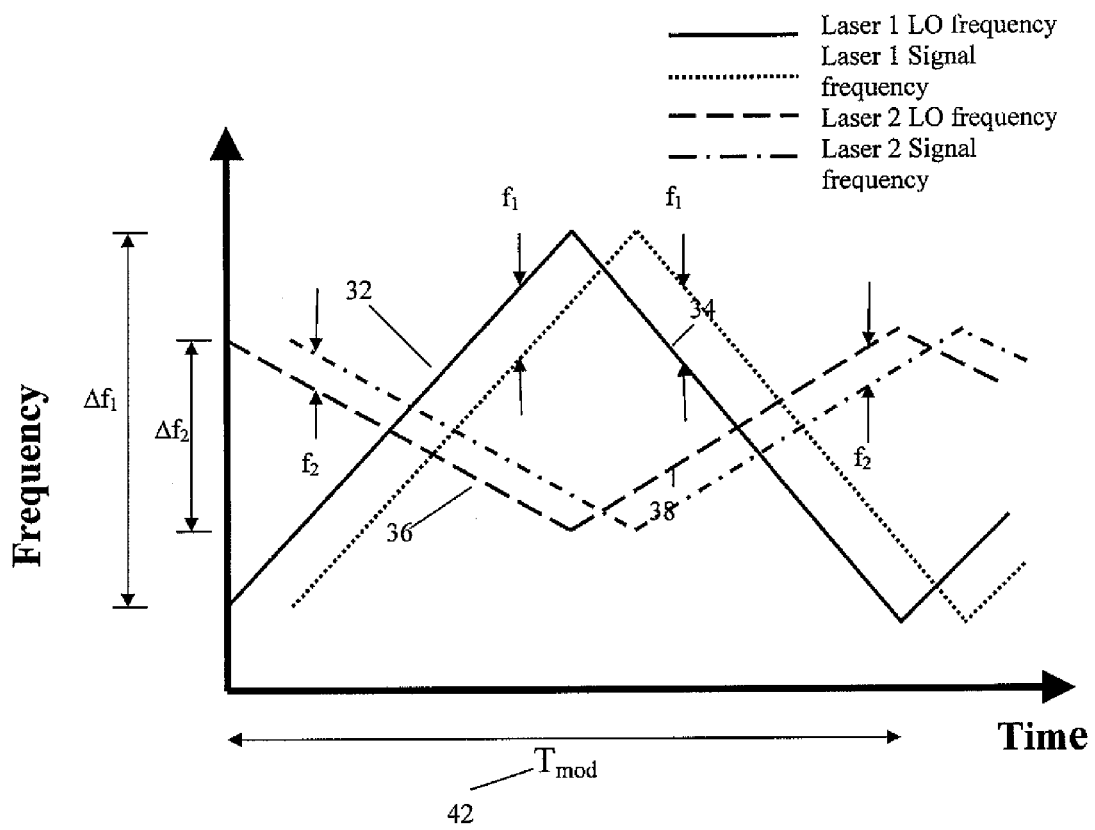
FIG. 1 is a graphical diagram of the laser optical frequency and the heterodyned radio frequency (RF) signal of coherent laser radar.

Referring to FIG. 1, in coherent or FM laser radar that uses a diode laser as its source, the frequency of the laser is modulated directly by modulating the laser's injection current. Typically, the frequency is modulated with a waveform with the objective of producing linear modulation. This type of modulation is often referred to as a chirp. The two chirping modulation input signals or waveforms that are sent to the two lasers to modulate their output wavelength are not identical. Each laser is unique in how it tunes and therefore a unique waveform must be generated for each laser. Both the waveform shape and amplitude vary from laser to laser. It is important to generate an input injection current waveform that produces a linear chirp of a given change in wavelength over the duration of the chirp. In a common form of modulation for this type of application, the injector current modulation signals are uniquely shaped for each laser and are distorted sawtooth waves intended to produce a linear sawtooth frequency modulation envelope for the output of the laser. The basis of coherent FMCW reflectometry is the heterodyne mixing of two signals originating from the same linearly chirped source, one signal following a local oscillator "LO" path, while the other reflects back from the target. Any time delays between the signals reflected back from sites along the test path and the signal from the reference reflection give rise to beat frequencies in the mixed output. The values of the beat frequencies are proportional to the time delays, while the sizes of the signals at the beat frequencies are proportional to the corresponding reflection factors. A spectral analysis of this output therefore reveals the locations (relative to the reference path length) and strengths of any sites of reflection along the test path.

Referring now to FIG. 1, the frequencies of LO light and signal light for each of first laser source 13 and second laser source 11 are graphically depicted as waveforms 32, 34, 36, and 38. For the case of no relative motion between the radar and target 21 (used interchangeably herein with object 21), there is no Doppler shift and the beat frequency generated by mixing the LO and signal light is the same for the upsweep and the down sweep of each of first laser source 13 and second laser source 11. For first laser source 13, beat frequency is $f_1$ 33, and second laser source 11, beat frequency is $f_2$ 35. Modulation period 42, $T_{mod}$, is identical for both first laser source 13 and second laser source 11, and first laser source 13 is 180° out of phase with second laser source 11. The upsweep of first laser source 13 occurs during the downsweep of second laser source 11. Both lasers are swept about the same nominal frequency but first laser source 13 is swept a greater amount, $\Delta f_1$ 44, than laser two, $\Delta f_2$ 46. In this case the ratio of $f_1$ 33 to $f_2$ 35 is the same as the ratio of $\Delta f_1$ 44 to $\Delta f_2$ 46. By tuning first laser source 13 and second laser source 11 at two different rates, a single detector 23 can be used to detect the two mixed signals reducing the number of components needed. The two signals are at separate frequencies and can each be measured using digital signal processing techniques.

Figure 2:
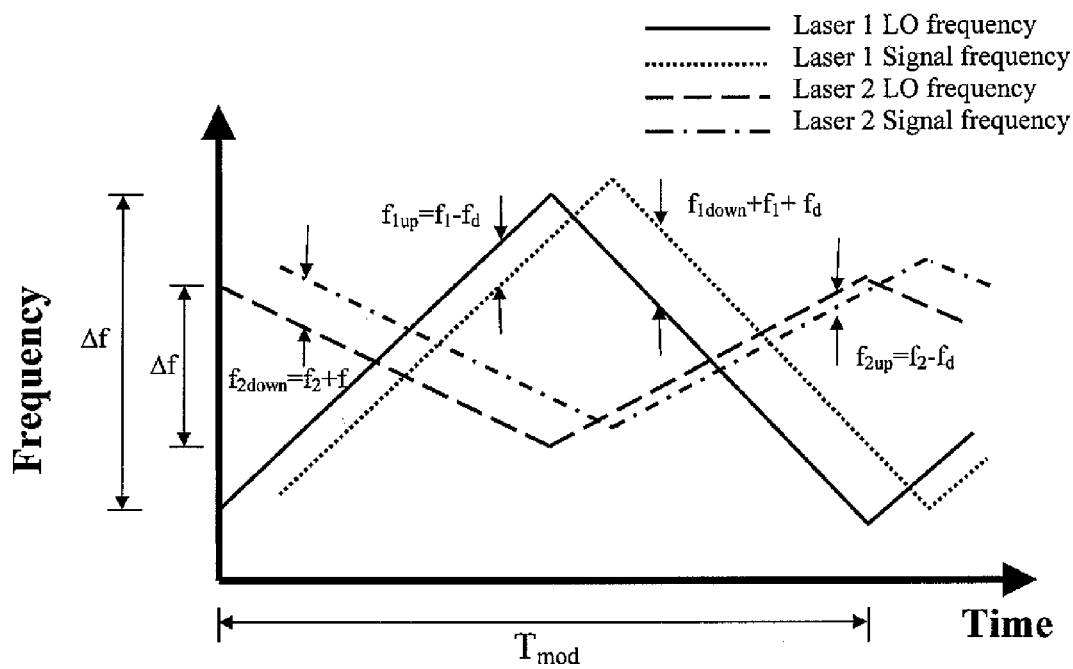
FIG. 2 is a graphical diagram of the linear frequency modulation, or "chirp," together with the corresponding "beat" frequency that results from combining the LO and target light signals for first laser source 13 and second laser source 11 in the presence of relative target motion.

Referring now to FIG. 2, the linear frequency modulation, or "chirp," together with the corresponding "beat" frequency that results from combining the LO and target light signals for first laser source 13 and second laser source 11 in the presence of relative target motion are graphically depicted. In exemplary FIG. 2, the laser base frequency is approximately 200 terahertz, and the "beat" frequency is in the 1 MHz range. If the surface being measured is moving relative to first laser source 13, the beat frequencies corresponding to laser upsweeps will be different from the beat frequencies corresponding to the downsweeps, due to Doppler frequency shifting. Measuring the frequency difference between signals can enable a determination of velocity to be made. If the range and velocity of the target are constant during one modulation period, $f_{1up}$ and $f_{1down}$ can be expressed as $$f_{1up} = |f_1 - f_d| \quad (1)$$

$$f_{1down} = |f_1 + f_d| \quad (2)$$

where $f_1$ is the frequency due to range and $f_d$ is the frequency due to the Doppler shift. If $f_1 > f_d$ then $$f_1 = \frac{f_{1up} + f_{1down}}{2} \quad (3)$$

$$f_d = \frac{f_{1up} - f_{1down}}{2} \quad (4)$$

and range and velocity can be expressed as $$f_1 = \frac{f_{1up} + f_{1down}}{2} = \frac{2R\Delta f_1}{cT_{mod}} \quad (5)$$

$$f_d = \frac{f_{1up} - f_{1down}}{2} = \frac{2v}{\lambda} \quad (6)$$

where $\lambda$ is the optical wavelength and $v$ is the relative velocity.

Similarly, $$f_2 = \frac{f_{2up} + f_{2down}}{2} = \frac{2R\Delta f_2}{cT_{mod}} \quad (7)$$

$$f_d = \frac{f_{2down} - f_{2up}}{2} = \frac{2v}{\lambda} \quad (8)$$

Continuing to refer to FIG. 2, if the surface being measured is moving relative to the laser light source, the beat frequencies corresponding to laser upsweeps will be different from the beat frequencies corresponding to the downsweeps, due to Doppler frequency shifting. Measuring the frequency difference between these signals can enable a determination of velocity to be made. While processing up and down chirps from a single laser allows for detecting separately the range and velocity of the target, the range data may be compromised if there is any intrachirp velocity variation such as can occur if the target is vibrating. By employing two, counter-chirping lasers, these velocity induced range errors can be compensated. The resulting signals can then be processed to provide a much greater immunity to velocity errors. Rather than using up chirp and down chirp from a single laser to determine the Doppler corrected range as in equations (5) and (7) above, the corrected range can be Doppler compensated by using just the upsweep of one laser and the corresponding down sweep of the other laser as shown in equation (9) below.

$$f_1 = \frac{f_{1up} + \frac{\Delta f_1}{\Delta f_2} f_{2down}}{2} = \frac{f_{1down} + \frac{\Delta f_1}{\Delta f_2} f_{2up}}{2} \quad (9)$$

This method not only greatly reduces Doppler errors but also effectively doubles the measurement rate reducing a single measurement time from $T_{mod}$ to one-half of $T_{mod}$.

If the accuracy of range measurement is limited by the linearity of the frequency modulation over the counting interval, then, if the target is one meter distant, a linearity of one part per thousand can provide 1 mm accuracy. If real time variances from linearity can be detected and compensated for, range measurement with single digit micron precision can be accomplished. FM lasers can be immune to ambient lighting conditions and changes in surface reflectivity because FM laser radars can rely on beat frequency, which is not dependent upon signal amplitude, to calculate range. This can enable an FM coherent system to make reliable measurements with a very small amount, for example, one picowatt, of returned laser energy, or a nine order-of-magnitude dynamic range of sensitivity.

The basis of coherent FMCW reflectometry is the heterodyne mixing of two signals originating from the same linearly chirped source, one signal following a local oscillator "LO" path, while the other reflects back from the target. Any time delays between the signals reflected back from sites along the test path and the signal from the reference reflection give rise to beat frequencies in the mixed output. The values of the beat frequencies are proportional to the time delays, while the sizes of the signals at the beat frequencies are proportional to the corresponding reflection factors. A spectral analysis of this output therefore reveals the locations (relative to the reference path length) and strengths of any sites of reflection along the test path.

Figure 3:
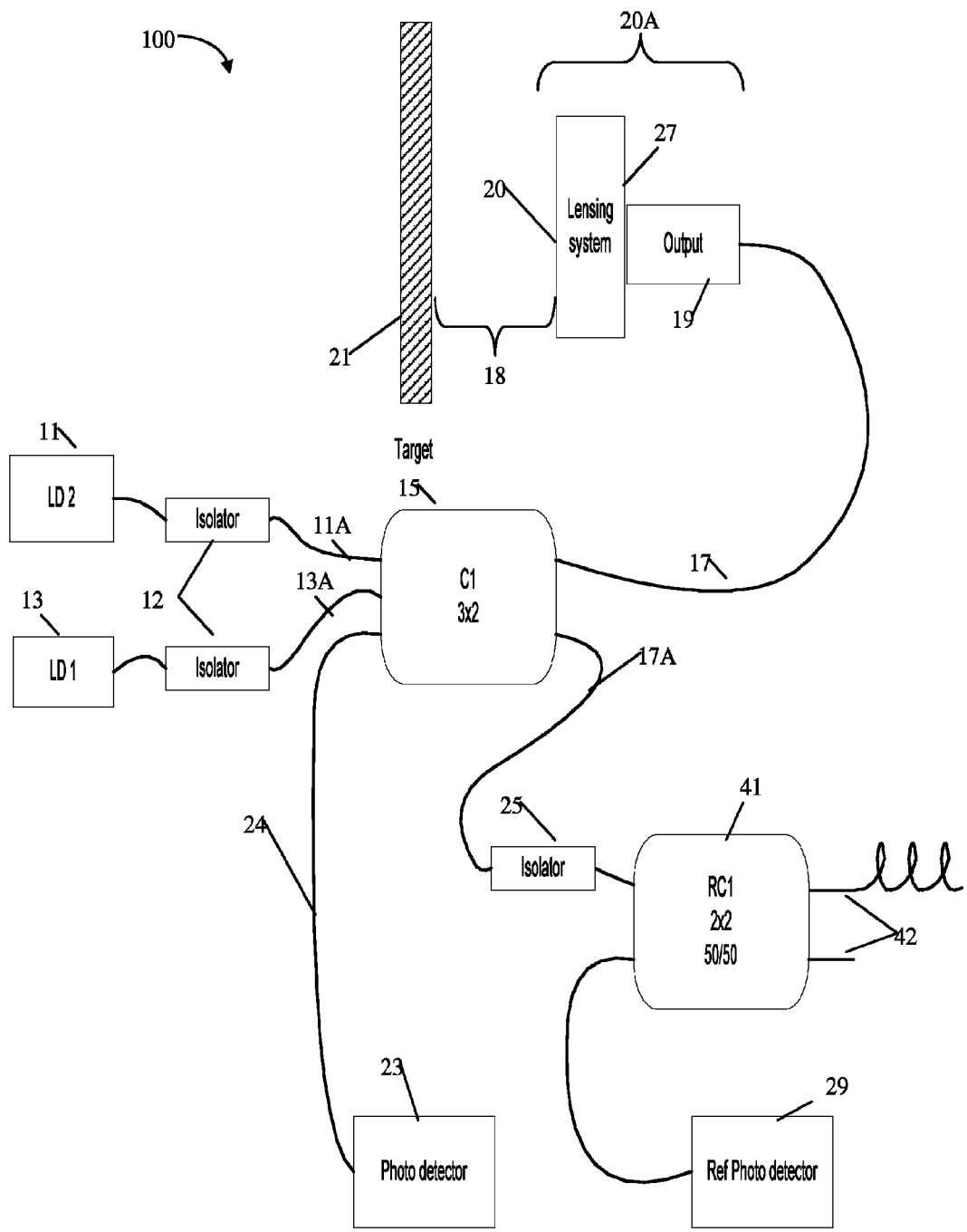
FIG. 3 is a schematic diagram of a configuration having two laser sources in a counter chirp configuration.

Referring now to FIG. 3, system 100 illustrates a configuration having two laser sources in a counter chirp configuration that results in a laser radar optical configuration. The lasers are tuned with two different tuning rates in a heterodyne mixing scheme to construct an embodiment of a dual chirp coherent laser radar that can be implemented on a planar lightwave circuit (PLC) and can be immune to environmental effects. In the present embodiment, the laser light can be, but is not limited to being, generated by two polarization maintaining (PM) fiber pigtailed laser diodes LD1 13 and LD2 11. The light from laser LD1 13 is frequency modulated at a rate that is a function of the tuning rate of LD2 11. The light from each laser passes through fiber optic optical isolator 12 to prevent back-reflected light from disrupting the tuning characteristics of the lasers. The light from each laser is combined in, for example, but not limited to, a 3×3 PM coupler 15 using five of the six possible ports. The light can then travel down combined light path beam 17 (used interchangeably herein with fiber 17) and can be transported to the site of the measurement through gap 18 with geometric flexibility. At the end of fiber 17, the light emerges from combined light path beam 17, passes out of the fiber at the output 19 and is partially reflected back into the fiber at the fiber end. The reflected light paths become local oscillator (LO) paths for each laser radar. The light that emerges from fiber 17, reflects off target 21, and returns to fiber 17 defines the signal path of the laser radar. Optionally, lensing system 27 can be used to focus the light in the measurement region of interest in order to maximize the amount of light returned to fiber 17. Lensing system 27 can be, for example, a fixed focus system or an adjustable focus system depending upon the optical depth of field needed. In addition, after emerging from lensing system 27, the light can be directed to different parts of target 21 by means of an optional scanning mirror (not shown) to provide 2D or 3D measurements. Upon emerging from output 19, the light from laser LD1 13 and LD2 11 is linearly polarized in one direction. Upon reflection from target 21, the light from each laser is reinjected back into the fiber carrying combined light path beam 17 in the same polarization axis. The light in both the LO path and signal path travels back through coupler 15 to optical detector 23 where the light from the two paths mix to form the RF signal that is proportional to the range difference between the two paths. The RF signal can contain two frequencies that can correspond to the tuning rate of each laser. Since the LO paths and the signal paths travel in the fiber carrying combined light path beam 17 and fiber 24, the interference can be considered to be occurring at the interface 20 that creates the LO signal, and thus, the path length difference between the LO path and its respective signal path is equal to the distance to be measured. Therefore, optical path changes in the fiber carrying combined light path beam 17 and the fiber 24 carrying combined light path beam due to environmental effects such as temperature changes will have no effect on the measured signal. The length of the fiber carrying combined light path beam 17 from the coupler 15 to output 19 can therefore be made arbitrarily long without degrading the measurement. This allows placement of a sensor head which can include, but is not limited to including, output 19, lensing system 27, and scanning mechanisms, in areas of restricted volume while the remainder of system 100, including, but not limited to, other optics, electronics, and power supplies, can be located apart from the sensor head. In addition, an all fiber optic construction can provide for a ruggedized unit that can resist misalignment or degradation by airborne containments.

Continuing to refer to FIG. 3, for precision measurements reference standard 41/42 can be included both for absolute ranging accuracy and to help linearize and monitor the chirp waveforms of the lasers. Reference standard 41/42 can take the form of, for example, but not limited to, a fiber optic interferometer in a Michaelson configuration. If the length of the fiber in the reference arm is calibrated, reference standard 41/42 can serve as an absolute length standard for system 100 as well as provide a signal useful in the linearization of first laser source 13 and second laser source 11 waveforms. In a similar manner, reference detector 29 can provide a signal useful in the linearization of both lasers. Another useful use of reference standard 41/42 is to detect the exact tuning of the laser at a given instant which can be used to determine the differential Doppler. Isolator 25 can isolate signal photo detector 23 from light from reference standard 41/42. The combination of 2×2 coupler 41 and fibers 42 is a Michaelson reference arm which operates as follows: light enters 2×2 coupler 41 from isolator 25 and is split between output fibers 42. Upon hitting the air/glass interface at the ends of fibers 42, a portion of the light is reflected in each fiber which then travels back to 2×2 coupler 41 and on to reference detector 29. The resulting mixed signals are associated with the tuning rate of each laser and with the length difference between fibers 42.

Continuing to refer primarily to FIG. 3, the method for determining a measured distance between interface 20 of measuring device 20A and object 21 can include, but is not limited to including, the steps of producing first light beam 13A having a first frequency from first laser source 13 and second light beam 11A having a second frequency from second laser source 11, chirping up the first frequency at a first rate as the second frequency is chirped down at a second rate, chirping up the second frequency at the second rate as the first frequency is chirped down at the first rate, combining first light beam 13A and second light beam 11A, directing combined light beam path 17 toward object 21, receiving reflected local oscillator (LO) path light beam 461 (FIG. 11) associated with combined light beam path 17, receiving target-reflected signal path light beam 469 (FIG. 11) associated with combined light beam path 17, and heterodyning LO path light beam 461 (FIG. 11) and the target-reflected signal path light beam 469 (FIG. 11) to generate two different beat frequencies that are proportional to the measured distance, the two beat frequencies being detected by single detector 23.

Continuing to still further primarily refer to FIG. 3, the system 100 for determining a measured distance between measuring device 20A and object 21 can include, but is not limited to including, first laser source 13 for producing first light beam 13A having first waveform 32 and first frequency, second laser source 11 for producing second light beam 11A having a second frequency, second light beam 11A having a second waveform 36, wherein the first frequency is chirped up at a first rate as the second frequency is chirped down at a second rate, and the second frequency is chirped up at the second rate as the first frequency is chirped down at the first rate. System 100 can further include optical element 15 for combining first light beam 13A with second light beam 11A into combined light beam path 17. Optical element 15 can split a returning portion of combined light beam path 17 into third light beam 24 (used interchangeably herein with fiber 24), and single detector 23 for receiving third light beam 24 including two different beat frequencies that are proportional to the measured distance.

Figure 4:
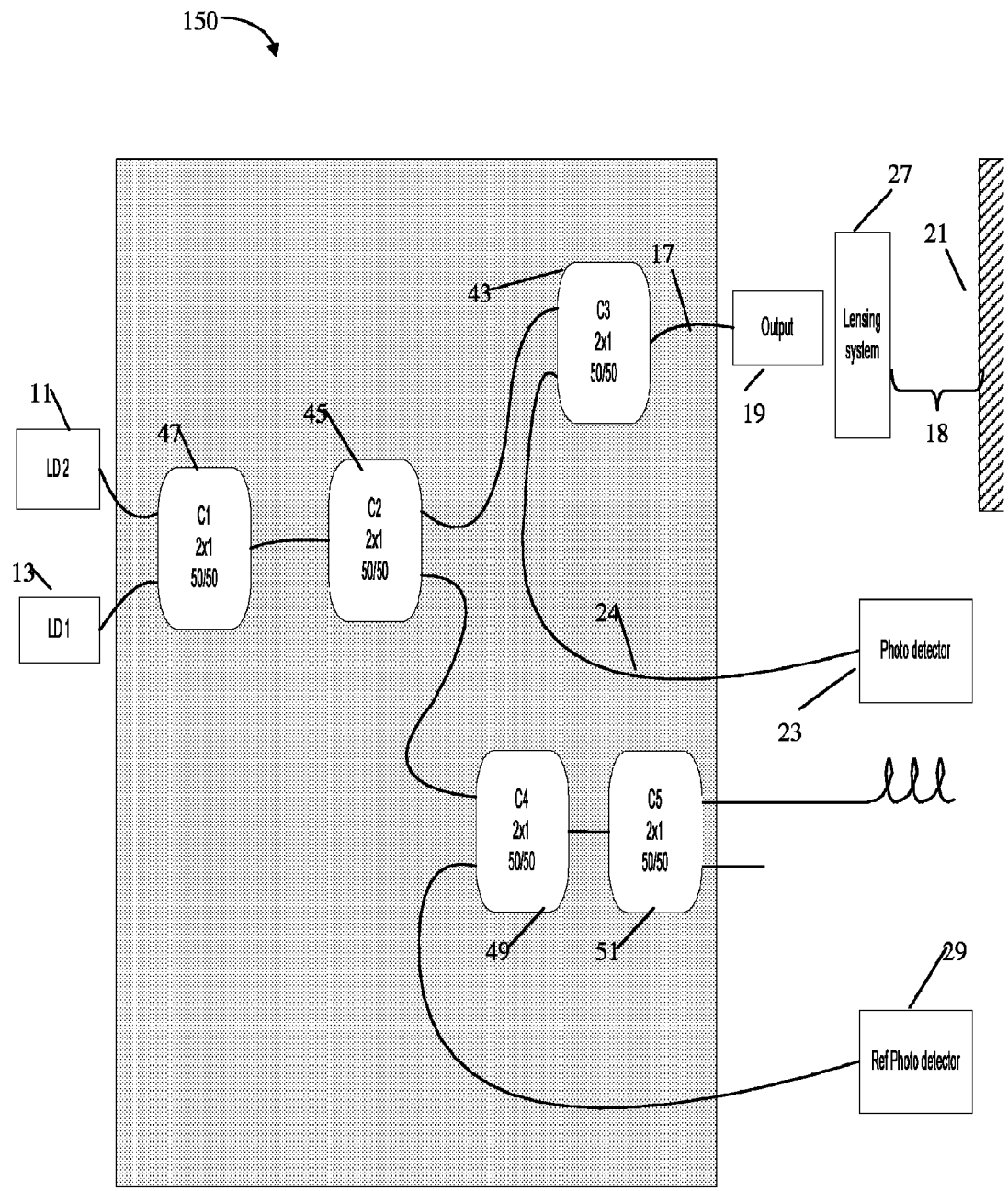
FIG. 4 is a schematic diagram of an alternate embodiment that can minimize back reflections and also make the circuit easier to implement on planer lightwave circuits.

Referring now primarily to FIG. 4, system 150 illustrates an alternate embodiment. This configuration can minimize back reflections and also make the circuit easier to implement on planer lightwave circuits. It replaces 3×2 coupler 15 (FIG. 3) by three 2×1 couplers 43, 45, and 47, and 2×2 coupler 41 (FIG. 3) by two 2×1 couplers 49 and 51. Note that isolators 12 between first laser source 13/second laser source 11 and 2×1 coupler 47 are not shown, but are part of system 150.

Figure 5A:
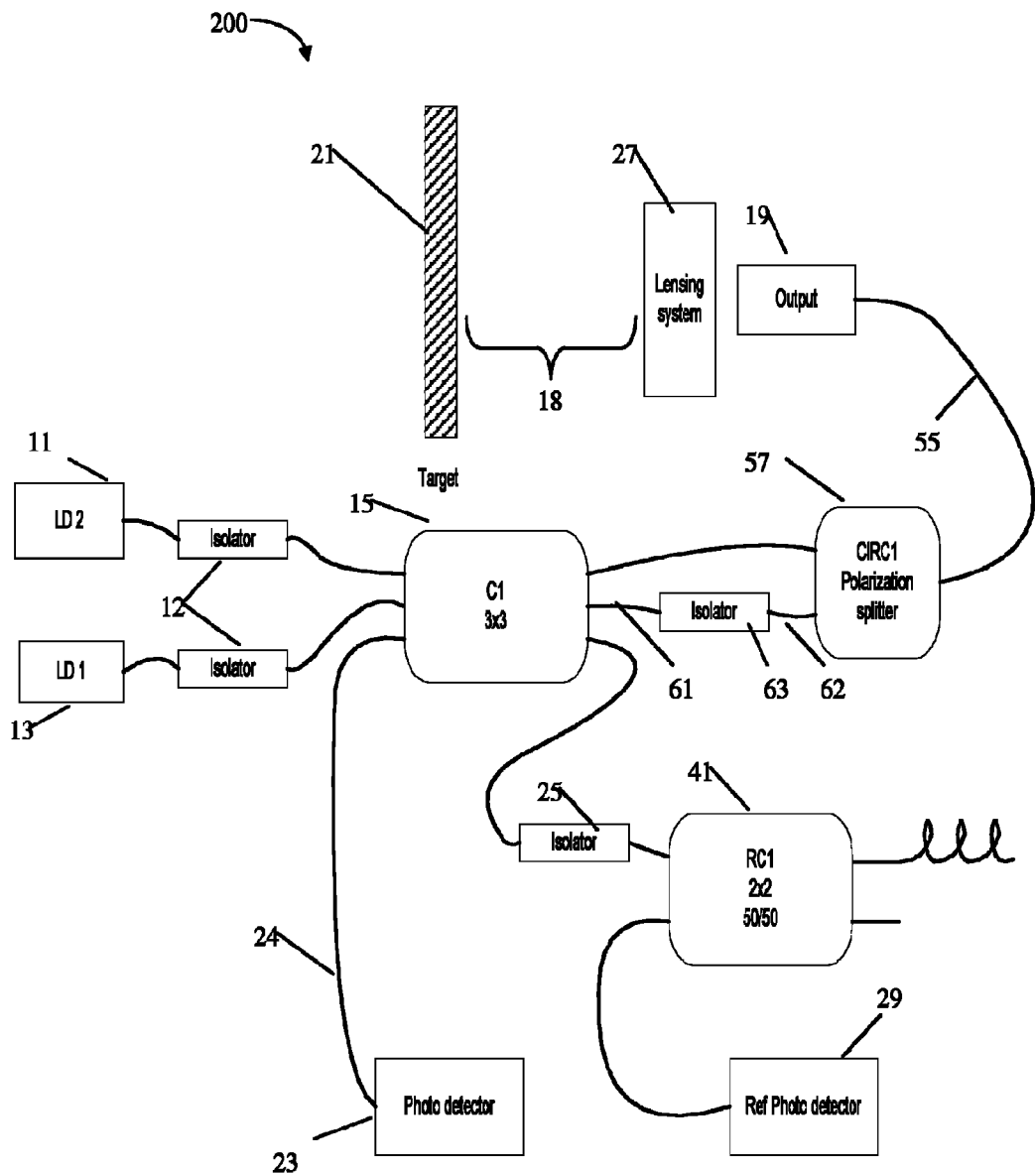
FIG. 5A is a schematic diagram of a further alternate embodiment having a 3×3 polarization maintaining coupler, where the embodiment could increase the sensitivity of the system by decreasing the amount of noise generated by light backscattering along the output fiber.
Figure 11:
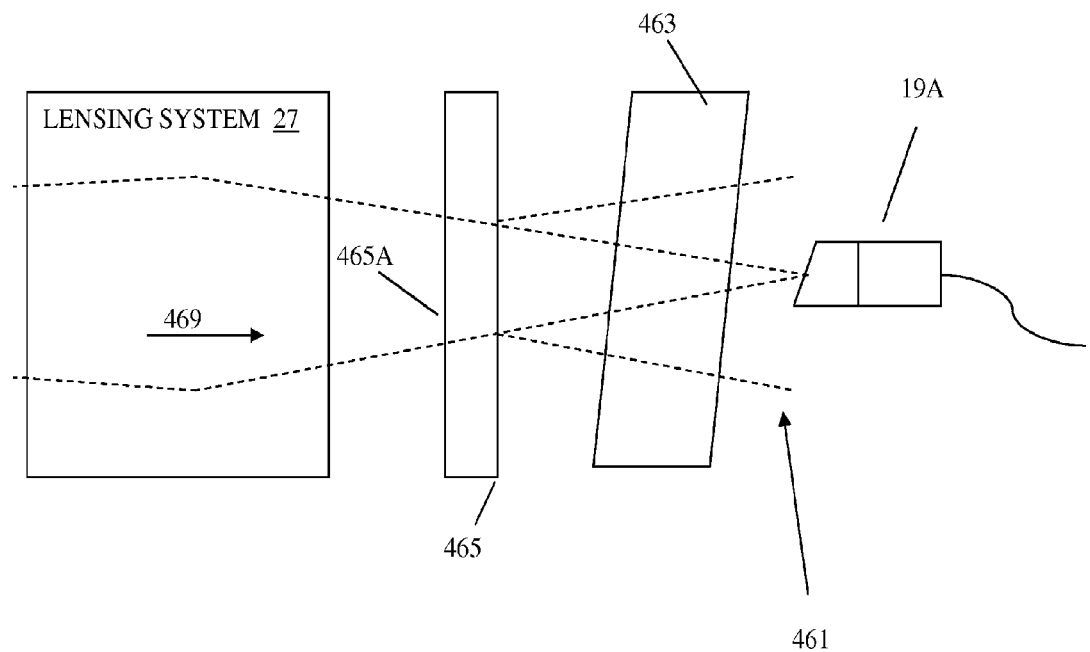
FIG. 11 is a schematic diagram of the generation of local oscillator and signal paths.

Referring now to FIGS. 5A and 11, system 200 illustrates a further alternate embodiment. This configuration is based on a polarization diplexing scheme which could increase the sensitivity of the system by decreasing the amount of noise generated by light backscattering along the output fiber. In this geometry, the light from each laser is combined in 3×3 polarization maintaining coupler 15. The light then travels down the top fiber to polarization splitter 57. The light that travels down fiber 61 is extinguished by isolator 63. The output light from fiber 55 then exits fiber 55 and enters lensing system 27. In this case, the fiber end is angled such that no light is reflected back into fiber 55 from the interface 20. A ¼ wave plate 463 (FIG. 11) can convert the optical polarization to circularly polarized light. The fiber end can be angled such that no light is reflected back into fiber 55 from the air/glass interface. A partial reflector 465 (FIG. 11) can reflect a small amount of the light back through ¼ wave plate 463 (FIG. 11) and into the orthogonal polarization axis of output fiber 55. This light serves as the local oscillator (LO). The light that emerges from lensing system 27 reflects off target 21, and returns to fiber 55 through ¼ wave plate 463 (FIG. 11) can define the signal path of the laser radar. This light is also in the orthogonal polarization axis. The light in both the LO and signal paths travels back through polarization splitter 57 and is directed along second fiber 62 through isolator 63 to coupler 15 then to optical detector 23 where the light from the two paths mix to form the RF signal that is proportional to the range difference between the two paths. The RF signal contains two frequencies that correspond to the tuning rate of each laser. In this geometry, the backscattered light in the output fiber is in an orthogonal polarization to the LO beam and it will not coherently mix and thus will not produce a noise signal.

Figure 5B:
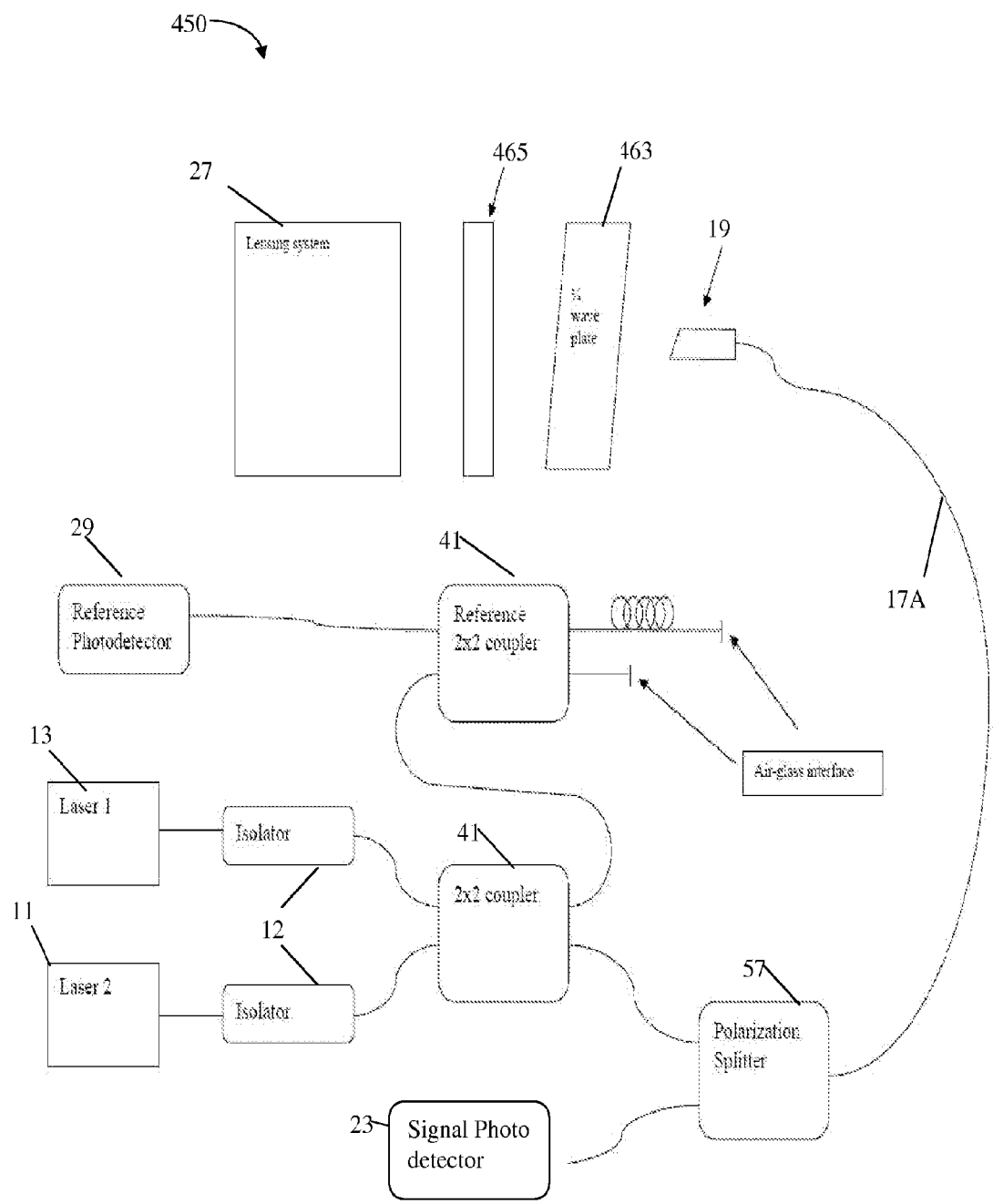
FIG. 5B is a schematic diagram of a further alternate embodiment having a 2×2 polarization maintaining coupler, where the embodiment could also increase the sensitivity of the system by decreasing the amount of noise generated by light backscattering along the output fiber.

Referring now primarily to FIG. 5B, system 450 illustrates a further alternate embodiment. This configuration is based on a polarization diplexing scheme which could increase the sensitivity of the system by decreasing the amount of noise generated by light backscattering along the output fiber. In this geometry, the light from each laser passes through isolator 12 and is combined in 2×2 polarization maintaining coupler 41. The light then travels to polarization splitter 57. From there the output light travels down fiber 17A then exits fiber output 19. The fiber output end is angled to prevent light backreflecting back into fiber 17A. Since all the components are polarization maintaining, the light emerges from fiber output 19 linearly polarized. The light then passes through ¼ wave plate 463 (FIG. 11) which converts the linear polarized light to circularly polarized light, for example, right hand circularly polarized. Partial reflector 465 (FIG. 11) can reflect a small amount of the light back through ¼ wave plate 463 (FIG. 11) and into the orthogonal polarization axis of output fiber 19. This light serves as the local oscillator (LO). The remainder of the light that passes through lensing system 27 emerges from lensing system 27, reflects off target 21, and returns to fiber 17A through ¼ wave plate 463 can define the signal path of the laser radar. This light is also in the orthogonal polarization axis. The light in both the LO and signal path travels back through polarization splitter 57 and is directed along to optical detector 23 where the light from the two paths mix to form the RF signal that is proportional to the range difference between the two paths. The RF signal will contains two frequencies that correspond to the tuning rate of each laser. In this geometry, the backscattered light in output fiber 19 is in an orthogonal polarization to the LO beam and it will not coherently mix and thus will not produce a noise signal.

Referring primarily to FIG. 5B and FIG. 3, an alternative to this geometry is to use angled fiber/¼ wave plate/partial reflector lensing geometry with the fiber geometry of FIG. 3. This geometry can prevent the noise due to the backscattered light as well as reduce the component count. A partial reflector can reflect a small amount of the light back through ¼ wave plate 463 (FIG. 11) and into the orthogonal polarization axis of output fiber 17. This light serves as the local oscillator. The light that emerges from lensing system 27, reflects off target 21, and returns to fiber 17 through ¼ wave plate 463 (FIG. 11) defines the signal path of the laser radar. This light is also in the orthogonal polarization axis. The laser light is generated by PM fiber pigtailed laser diodes LD1 13 and LD2 11. The light from laser LD1 13 is frequency modulated a rate different than that of LD2 11. The light from each laser passes through fiber optic optical isolator 12 to prevent back-reflected light from disrupting the tuning characteristics of the lasers. The light from each laser is combined in 3×3 polarization maintaining coupler 15. The light then travels down fiber 17 and can be transported to the site of the measurement with geometric flexibility. At the end of fiber 17, the light emerges from the fiber, passes through the ¼ wave plate 463 (FIG. 11) and is partly reflected by partial reflector 465 (FIG. 11). The reflected light paths become the local oscillator (LO) paths for each laser radar. The light that emerges from fiber 17, reflects off target 21, and returns to fiber 17 defines the signal path of the laser radar. Optionally, lensing system 27 can be used to focus the light in the measurement region of interest in order to maximize the amount of light returned to optical fiber 17. Lensing system 27 can be, for example, a fixed focus system or an adjustable focus system depending upon the optical depth of field needed. Further optionally, after emerging from lensing system 27, the light can be directed to different parts of target 21 by means of a scanning mirror to provide 2D or 3D measurements.

Figure 6:
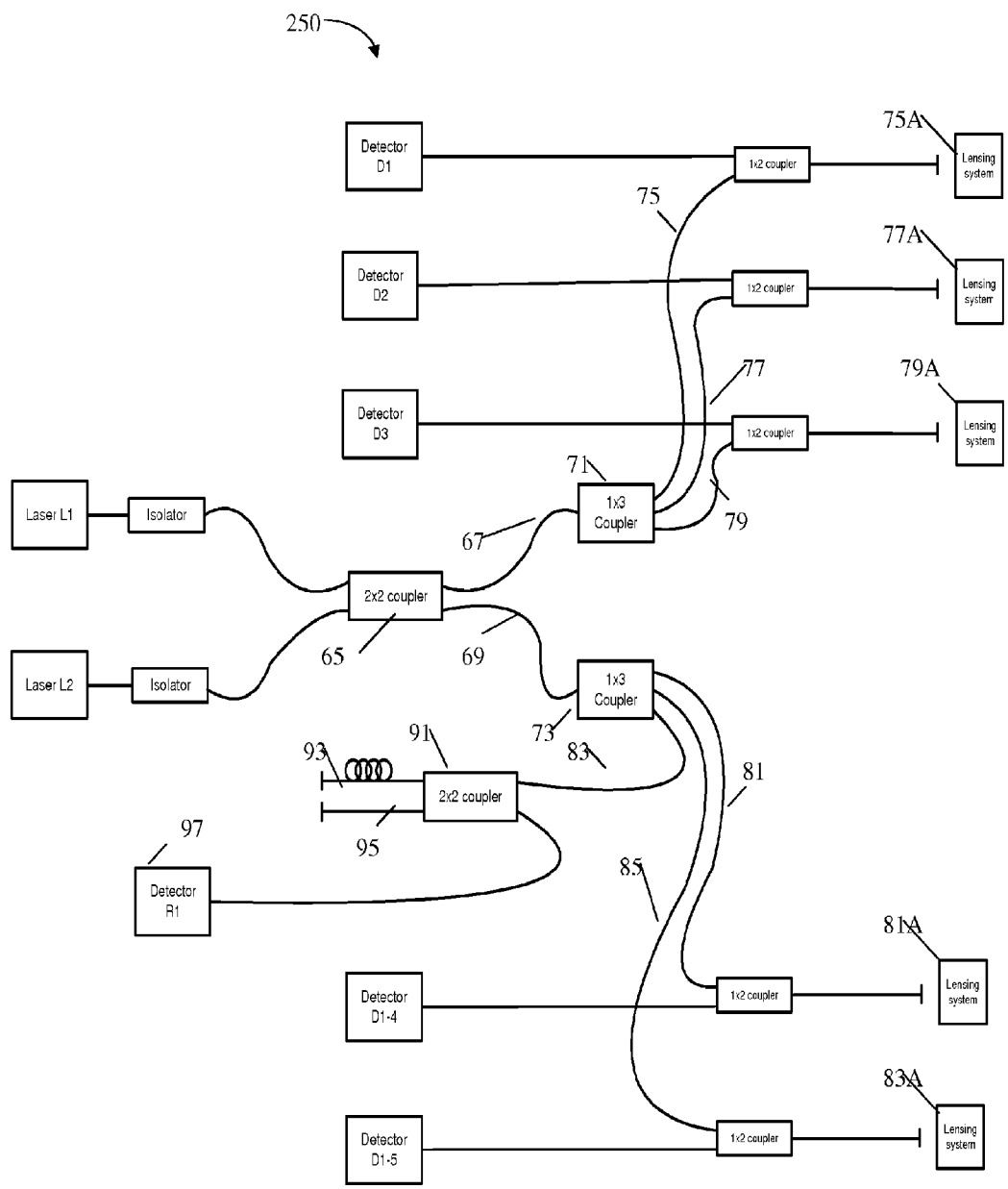
FIG. 6 is a schematic diagram of a further alternate embodiment having multiple output beams.

Referring now to FIG. 6, there are applications of this technology that could benefit from having multiple output beams. System 250 is a further alternative embodiment based on the main concept of this disclosure. In system 250, the outputs of the two lasers are mixed together in 2×2 coupler 65. Outputs 67 and 69 of coupler 65 feed into couplers 71 and 73 which provide multiple output channels each. In this case, 1×3 couplers 71 and 73 are used to provide for five output beams 75, 77, 79, 81, and 85, and reference arm 83. Each output channel consists of a 1×2 coupler which directs the light to lensing systems 75A, 77A, 79A, 81A, and 83A, the fiber/glass interface which generates the LO and a detector for detecting the two signal frequencies. Also shown is a Michaelson reference arm composed of 2×2 coupler 91, two offset lengths of fiber 93 and 95 and reference detector 97. Other reference arms could be used, for example, but not limited to, a Mach Zehnder configuration reference arm.

Figure 7:
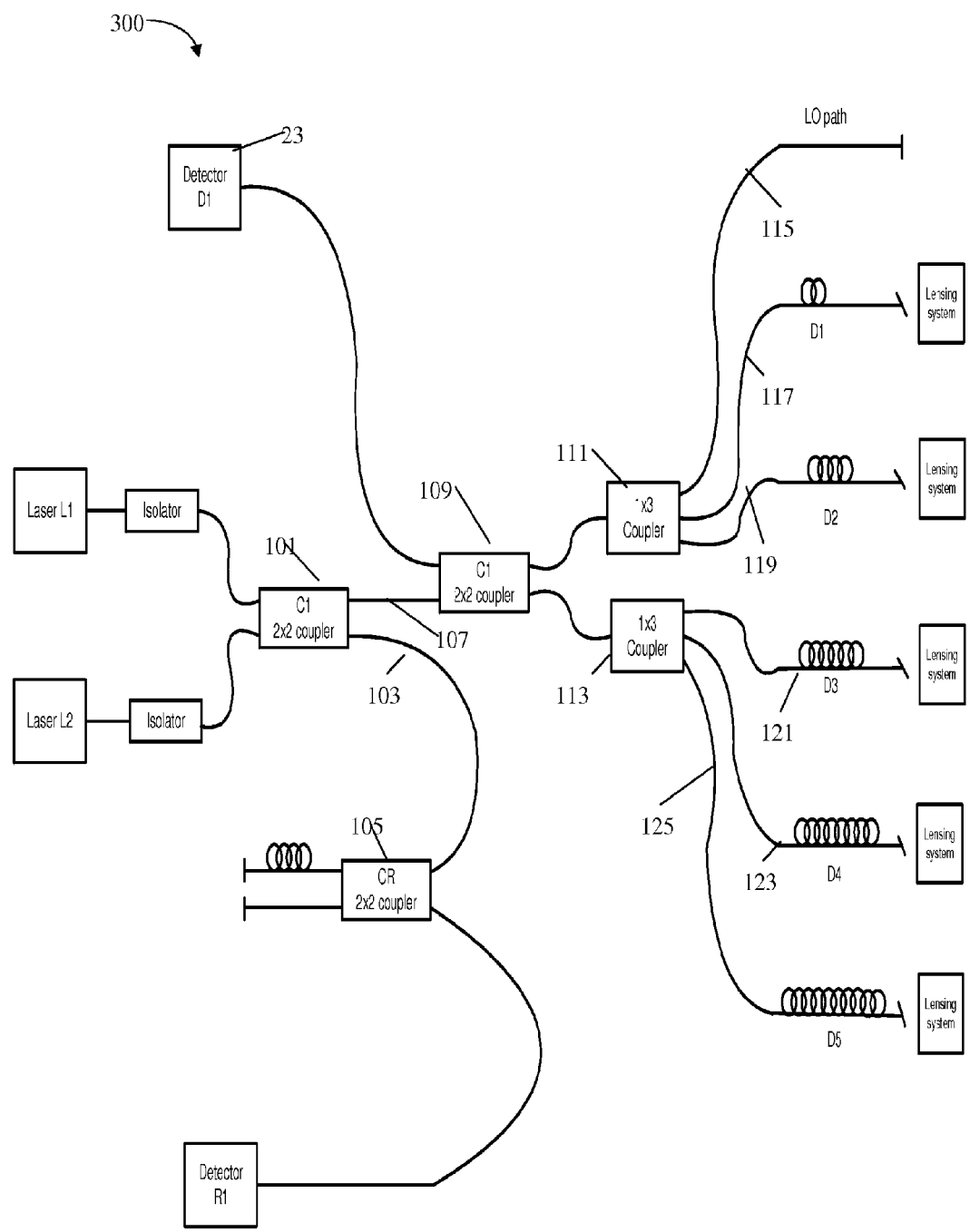
FIG. 7 is a schematic diagram of a geometry that uses delay lines to multiplex the various output signals onto one detector, thus reducing the cost and complexity of the radar.

Referring now to FIG. 7, system 300 shows a geometry that uses delay lines to multiplex the various output signals onto one detector, thus reducing the cost and complexity of the radar. In this case, the lasers are combined in 2×2 coupler 101. Output 103 of coupler 101 feeds reference arm coupler 105. In this case, the reference arm is shown in, for example, but not limited to, a Michaelson configuration. Output 107 is directed to 2×2 coupler 109 which in turn feeds the multiple output fibers via 1×3 couplers 111 and 113. In this case, outputs 115 is used to generate the LO via the reflection off the air/glass interface. Outputs 117, 119, 121, 123, and 125 are fibers with varying amounts of fiber delays (D1, D2, D3, D4, and D5). The ends of these fibers are angled so that more LOs are not generated. Since there are varying delays, the signals that are generated by the light reflecting off the target returns a different frequency at detector 23. And since the lasers are being tuned at different rates, the signals from the lasers are also separated in frequency.

Figure 8:
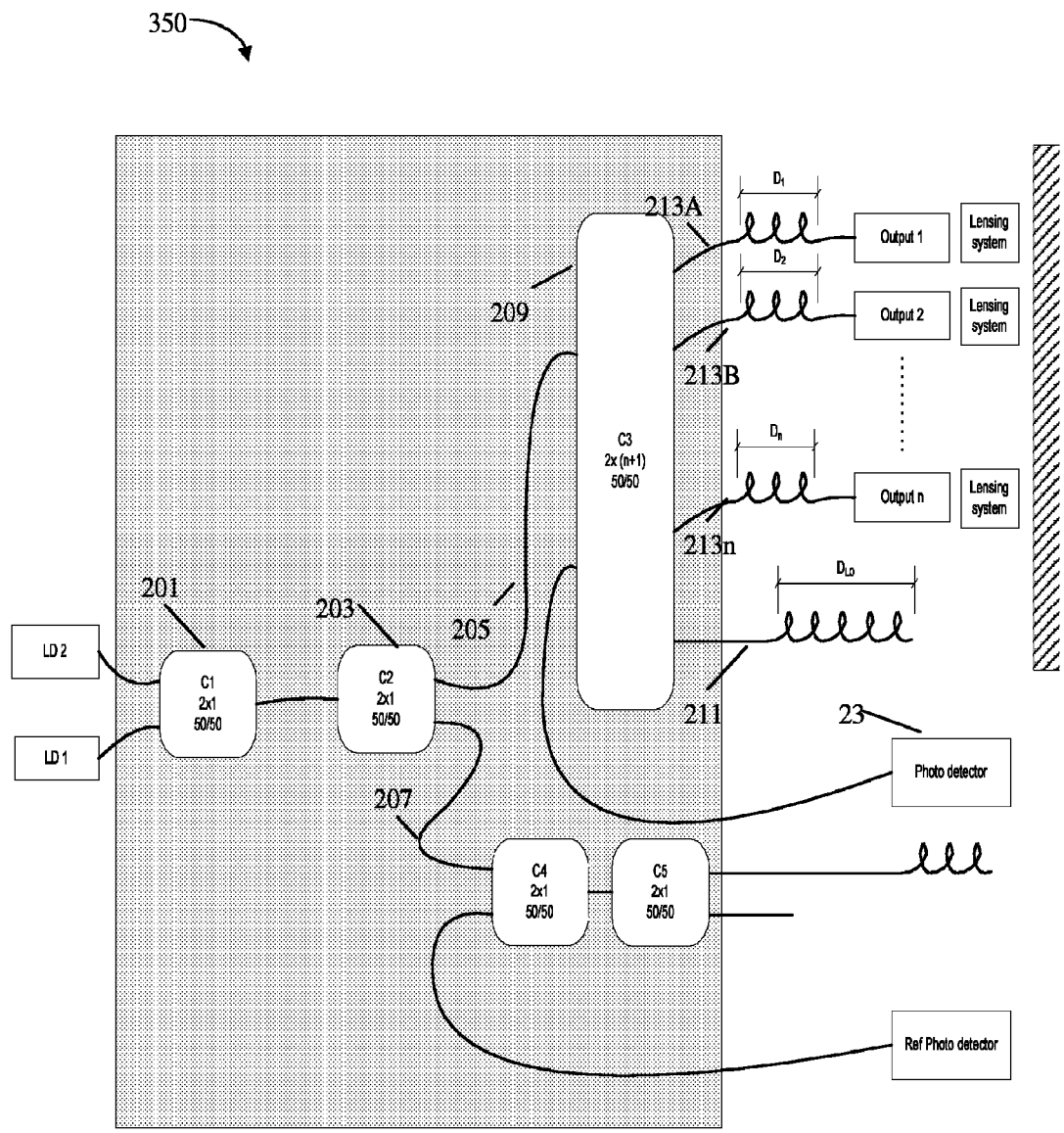
FIG. 8 is a schematic diagram of an alternate embodiment a configuration of the multi-beam concept.

Referring now to FIG. 8, system 350 presents an alternate embodiment a configuration of the multi-beam concept. System 350 could minimize the back reflections and also make the circuit easier to implement on a planer lightwave circuits. In system 350, the light is combined in 2×1 coupler 201 and then split in 2×1 coupler 203, fiber 207 goes to the reference arm and fiber 205 goes to the signal arm. Fiber 205 is directed to splitter 2×(n+1) 209, where n is the number of beams. Fiber 211 carries the LO path and fibers 213A, 213B, ... 213n carry the output beams with different fiber length so that photo detector 23 can carry all the signals which can be propagated depending on the differing delays.

Figure 9:
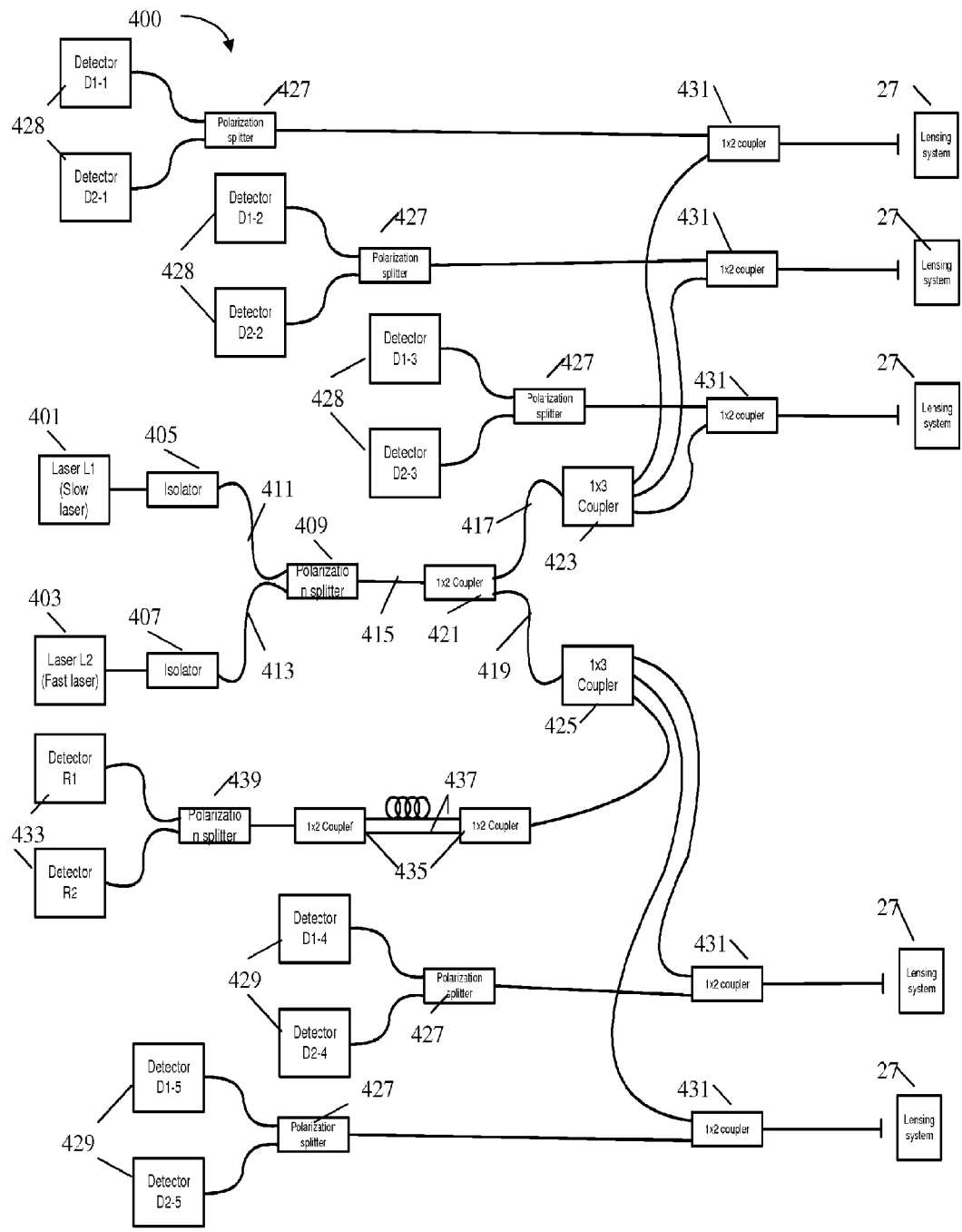
FIG. 9 is a schematic diagram of another alternate multi-output embodiment.

Referring now to FIG. 9, system 400 presents another alternate multi-output embodiment. In system 400, the laser light is generated by two PM fiber pigtailed laser diodes 401 and 403. The light from laser 401, designated the slow laser, is aligned with the slow axis of the PM fiber. The light from laser 403, designated the fast laser, is aligned with the fast axis of the PM fiber. In system 400, the light from lasers L1 401 and L2 403, after passing through isolators 405 and 407 respectively, are combined by a polarization splitter 409. Polarization splitter 409 can couple the light in the slow axis of fiber 411 and the light in the fast axis of fiber 413 into the corresponding axes of fiber 415. The light from the laser LD1 401 and LD2 403 are split into fibers 417 and 419 by means of 1×2 fiber optic coupler 421 such that their orthogonal polarizations are preserved. The light is then split into multiple outputs by 1×3 couplers 423 and 425. Each output channel can include a 1×2 coupler which can direct the light to lensing systems 27, the fiber/glass interface which generates the LO, polarization splitters 427 which separate the two signals generated by each laser, and detectors 429 for detecting the signal frequency. The light from laser L1 401, which was in the slow axis, is reflected back into the slow axis and the light from laser L2 403, which was in the fast axis, is reflected back into the fast axis. These reflected light paths become the local oscillator (LO) paths for each laser radar. The light that emerges from the fiber, reflects off the target and returns to the fiber defines the signal path for each laser radar. Upon emerging from the output fiber, the light from laser L1 401 is linearly polarized in one direction and the light from laser L2 403 is linearly polarized in a direction orthogonal to the laser L1 401 light. Upon reflection from a target, the light from each laser is reinjected back into the fiber in its original axis. The laser L1 light in both the LO and signal path travels back through 1×2 couplers 431 and polarization splitters 427 to optical detectors 428 where the light from the two paths mix to form the RF signal that is proportional to the range difference between the two paths. In a similar manner, the laser L2 light from the LO and signal paths travels to L2 detectors 429. Since the light from the two lasers are always in orthogonal polarization states, they do not interfere with each other and the two resulting laser radar signals appear only at their own detectors. Also shown is a Mach Zehnder reference arm composed of 1×2 couplers 435, offset lengths of fiber 437, polarization splitter 439 to separate the two reference arm signals and two reference detectors. A Michaelson configuration reference arm could also be used. The source lasers typically used in this application are diode lasers with output wavelengths centered around 1550 nm (near IR). Since this wavelength is invisible to human vision, a second, visible laser frequency can be added to the fiber optic circuit to aid the user by providing a visible spot on the target at the same location as the IR measurement spot.

Figure 10:
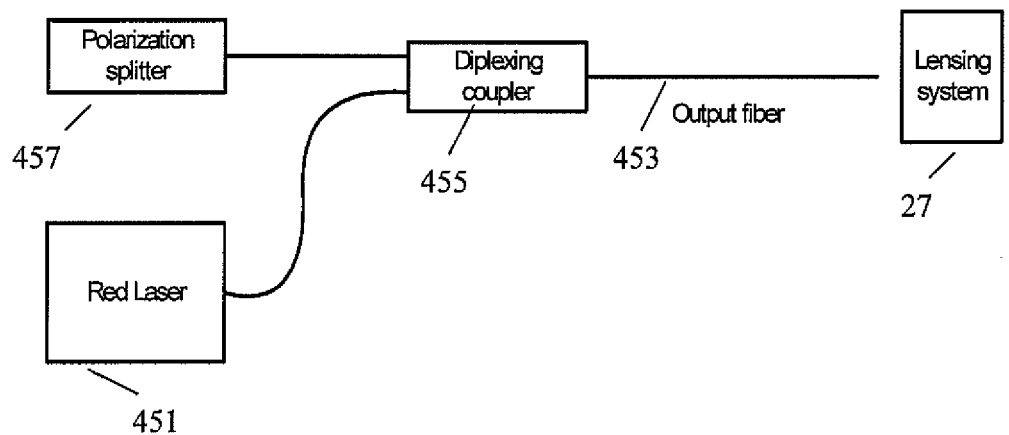
FIG. 10 is a schematic diagram of coupling the light from a fiber pigtailed visible laser diode into an output fiber.

Referring now to FIG. 10, the light from a fiber pigtailed visible laser diode 451 can be coupled into output fiber 453 by means of wavelength diplexing coupler 455. Coupler 455 can combine visible light from visible laser diode 451 with IR light from polarization splitter 457 into output fiber 453.

Referring now to FIG. 11, the end of the fiber output 19 is angled. This is the interface between the air and the glass of the fiber. If this is not angled, there is a reflection generated that returns along the fiber. This is how the LO path in FIG. 5A is generated. The light emerges from fiber 19, goes through ¼ wave plate 463 and some of it is reflected off partial reflector 465. Some of the reflected light goes back through ¼ wave plate 463 and reenters fiber 19. This is the LO path. The light is now in the orthogonal polarization due to the double pass through ¼ wave plate 463. The ¼ wave plate 463 is at an angle to prevent spurious reflections from reentering the fiber. Optionally, side 465A of partial reflector 465 could also be angled or could be antireflection coated.

Therefore, the foregoing is considered as illustrative only of the principles of the present teachings. Further, since numerous modifications and changes will readily occur to those skilled in the art, it is not desired to limit the present teachings to the exact construction and operation shown and described, and accordingly, all suitable modifications and equivalents may be resorted to, falling within the scope of the present teachings.

What is claimed is:

1. A method for determining a measured distance between an output of a measuring device and an object comprising the steps of:
producing a first light beam having a first frequency from a first laser source and a second light beam having a second frequency from a second laser source;
chirping up the first frequency at a first rate as the second frequency is chirped down at a second rate; the first rate and the second rate being different rates;
chirping up the second frequency at the second rate as the first frequency is chirped down at the first rate;
combining the first light beam and the second light beam using a combining coupler;
directing the combined light beam path toward the object;
receiving a reference path light beam for each light beam
receiving a target-reflected signal path light beam from said each light beam;
delivering the reference path light beam and the target-reflected signal, to a single detector; and
mixing the reference path light beam and the target-reflected signal path light beam to generate two different beat frequencies that are proportional to the measured distance, the two beat frequencies being detected by the single detector.

2. The method as in claim 1 further comprising the step of:
generating the first light beam and the second light beam by polarization maintaining fiber pigtailed laser diodes.

3. The method as in claim 1 further comprising the step of:
preventing back-reflected light from disrupting tuning characteristics of the first light beam and the second light beam.

4. The method as in claim 3 wherein said step of preventing comprises the step of:
optically isolating the combined light beam path.

5. The method as in claim 1 further comprising the step of:
focusing the combined light beam path towards a measurement region of the object.

6. The method as in claim 5 wherein said step of focusing comprises:
selecting a focusing means from a group consisting of a fixed focus system and an adjustable focus system.

7. The method as in claim 1 further comprising the step of:
producing an absolute distance measurement through use of a reference standard.

8. The method as in claim 7 wherein the reference standard is a fiber optic interferometer in a Michaelson configuration.

9. The method as in claim 1 further comprising the step of:
preventing noise due to backscattered light by use of an angled fiber, a ¼ wave plate, and a partial reflector.

10. A system for determining a measured distance between a measuring device and an object comprising:
a first laser source for producing a first light beam having a first waveform and a first frequency;
a second laser source for producing a second light beam having a second frequency, said second light beam having a second waveform; wherein said first frequency is chirped up at a first rate as said second frequency is chirped down at a second rate, and said second frequency is chirped up at the second rate as said first frequency is chirped down at the first rate; the first rate and the second rate being different rates;
an optical combining coupler receiving said first light beam and said second light beam and combining said first light beam with said second light beam into a combined light beam path; and
a single detector for mixing a reference path light beam for each light beam and a returning portion of said combined light beam path to generate two different beat frequencies that are proportional to the measured distance.

11. The system as in claim 10 further comprising:
polarization maintaining fiber pigtailed laser diodes for generating the first light beam and the second light beam.

12. The system as in claim 10 further comprising:
optical isolators for isolating the combined light beam path.

13. The system as in claim 10 further comprising:
a lensing system focusing the combined light beam path towards a measurement region of the object.

14. The system as in claim 13 further comprising:
a focusing component in said lensing system selected from a group consisting of a fixed focus system and an adjustable focus system.

15. The system as in claim 13 further comprising:
a visible laser frequency providing a visible spot on the object in the measurement region.

16. The system as in claim 10 further comprising:
a reference standard producing an absolute distance measurement.

17. The system as in claim 16 wherein said reference standard is a fiber optic interferometer in a Michaelson configuration.

18. The system as in claim 10 further comprising:
an angled fiber;
a ¼ wave plate; and
a partial reflector,
wherein a combination of said angled fiber, said ¼ wave plate, and said partial reflector prevents noise due to backscattered light.

19. The system as in claim 10 wherein said optical combining coupler comprises:
at least one polarization maintaining coupler.

20. The system as in claim 10 further comprising:
a polarization splitter dividing the input from at least one polarization maintaining coupler into oppositely polarized outputs.

21. The system as in claim 10 further comprising:
a plurality of couplers providing multiple output beams.

22. The system as in claim 10 further comprising:
a plurality of output fibers having fiber delays.

23. The system as in claim 10 further comprising:
a wavelength diplexing coupler combining visible light from a visible laser diode and infrared light from a polarization splitter into an output fiber.

24. The system as in claim 10 wherein the reference path light beam is comprised in a combined light beam path of the first light beam path and the second light beam path.

25. The system as in claim 24 wherein the combined light beam passes out of a fiber for directing toward the object and is partially reflected back into the fiber end as the reference path light beam.

26. The system as in claim 25 wherein the target-reflected path light beam is received at the end of the fiber.

27. The method as in claim 1 wherein the reference path light beam is comprised in a combined light beam path of the first light beam path and the second light beam path.

28. The method as in claim 27 wherein the combined light beam passes out of a fiber for directing toward the object and is partially reflected back into an end of the fiber as the reference path light beam.

29. The method as in claim 28 further comprising the step of receiving the target-reflected path light beam at the end of the fiber.

\* \* \* \* \*

UNITED STATES PATENT AND TRADEMARK OFFICE
CERTIFICATE OF CORRECTION

PATENT NO.       : 8,687,173 B2
APPLICATION NO.  : 13/061559
DATED            : April 1, 2014
INVENTOR(S)      : Mina Rezk et al.

It is certified that error appears in the above-identified patent and that said Letters Patent is hereby corrected as shown below:

In the Claims:

In column 13, line 21 (claim 1, line 11), "each light beam" should read -- each light beam; --

Signed and Sealed this
Seventeenth Day of June, 2014

Michelle K. Lee
*Deputy Director of the United States Patent and Trademark Office*